United States Patent [19]

Davis et al.

[11] 4,081,603

[45] Mar. 28, 1978

[54] POSITION COORDINATE DETERMINATION DEVICE

[75] Inventors: Robert L. Davis, Prospect; Stephen L. Domyan, Norwalk, both of Conn.

[73] Assignee: Summagraphics Corporation, Fairfield, Conn.

[21] Appl. No.: 775,158

[22] Filed: Mar. 7, 1977

[51] Int. Cl.² ............................................. G08C 21/00
[52] U.S. Cl. .................................................... 178/19
[58] Field of Search ............... 178/18, 19, 20; 340/11, 340/17; 33/1 M, 1 P, 1 HH; 324/34 MA

[56] References Cited

U.S. PATENT DOCUMENTS 3,846,580  11/1974  Brenner ................................. 178/19
3,904,821  9/1975  Whetstone et al. .................. 178/19
4,018,989  4/1977  Snyder et al. ........................ 178/19

*Primary Examiner*—Thomas A. Robinson
*Attorney, Agent, or Firm*—Daniel M. Rosen

[57] ABSTRACT

A position coordinate determination device wherein data generation lines are displaced from the edges of a data surface, and a sensing device is movably located on the surface. Erroneous detection of data resulting from reflection of signals at the edge of the sheet is inhibited by summing the times required for waves to pass between the sensor and both data generation lines. When this sum exceeds a predetermined level, an erroneous detection is indicated and the processing of the data may be inhibited.

13 Claims, 3 Drawing Figures

POSITION COORDINATE DETERMINATION DEVICE

This invention relates to position determination devices and more particularly, to accuracy and improvement in position determination devices employing time scale digitization.

Graphical data devices requiring position and location are commonly employed in such areas as facsimile transmission and computer data input devices. Many forms of such devices have been proposed. Particularly accurate and desirable digitization devices of this type are described in U.S. Pat. No. 3,846,580 issued Nov. 5, 1974, U.S. Pat. No. 3,904,821 issrued Sept. 9, 1975, and U.S. Pat. No. 4,018,989 issued Apr. 19, 1977, all assigned to the assignee of the present invention. In each of those systems, coordinate digitization is effected by employing strain wave vibrational mode transmission and reception. In each case, a magnetostrictively induced strain wave is placed into a data surface by means of a suitable generation device. The data surface may be either a coordinate magnetostrictive wire mesh (U.S. Pat. No. 3,846,580) or a magnetostrictive sheet (U.S. Pat. No. 3,904,821). The time required to propagate the strain wave from the generating device to a pick-up is digitized. This digitization represents the datum corresponding to a coordinate position thereby locating a particular position. Either the generator or the receptor may be movable, it being required only that one be movable with respect to the other. Other forms of graphical data devices employing similar types of time transmission have been utilized for position determination and data input devices.

In the provision of devices of this type, especially wherein magnetostrictive transmission techniques are employed, errors may be introduced into the system due to the inherent characteristics of the strain waves traversing the data surface. This occurs since the characteristic of the primary generated wave form includes at least a plurality of nodes, of successively decreasing magnitude, which represent the characteristic of the wave introduced into the data surface. It is frequently desirable to sense the wave in the data surface at a position closely adjacent the position at which it was introduced into the sheet. The recovery time of the amplifier utilized to sense the presence of the wave at such locations, however, may be insufficient to enable the sensing of the first node. Since the first node is commonly employed as the reference point for the digitization of the coordinate position, the loss of the first node will result in the sensing of the second node as if it were the first node. As a result, an incorrect digitization will be achieved.

The present invention is therefore directed to the provision of a position determining device of the above-described type wherein means are provided for determining whether received data is correctly representative of the position of the sensor, and for inhibiting the consideration of erroneous data.

The realization of the foregoing objective provides a technique which enables certain other considerations to be taken into account by the position determining device. Thus, in a position determining device which may be of varying sizes, the use of accurately determinable coordinate position data in accordance with the size of the data surface can be employed to indicate the size of the data surface being digitized. Determination of the size of the data surface automatically in accordance with the foregoing objective gives rise to certain advantages enabling an increase in the accuracy of the digitization, as is described in aforementioned U.S. Pat. No. 4,018,989. In addition, where digitization is incorrectly determined due to electrical interference of the like, the resulting erroneous count may be detected in accordance with the technique described in conjunction with the objective of the present invention.

Finally, the biasing of the data surface, or the direction of polarity of the induced wave signals, if incorrect, (that is, if the bias is reversed), can also be detected in accordance with the technique which will be described by the present invention.

The foregoing advantages are realized in accordance with the invention by employing a system that introduces (or detects) strain waves at both ends of the data surface along a common axis. Upon detection, the transit time of each strain wave is digitized and a summation made of the data representative of the digitization time of each strain wave. Since the distance between the two data generation lines is known, within certain tolerances, correct data should result in a total indicated time within such tolerances. Accordingly, the detection of strain waves wherein the sum of the indicated times between the introduction of the wave fronts into the sheet and the sensing of the wave fronts is outside these tolerance levels indicates that an incorrect wave front has been detected. Detection of such data as erroneous may be indicated and further processing of data corresponding to the received signals may be inhibited.

In order that the invention will be more clearly understood, it will now be disclosed in greater detail with reference to the accompanying drawings, wherein.

Figure 1:
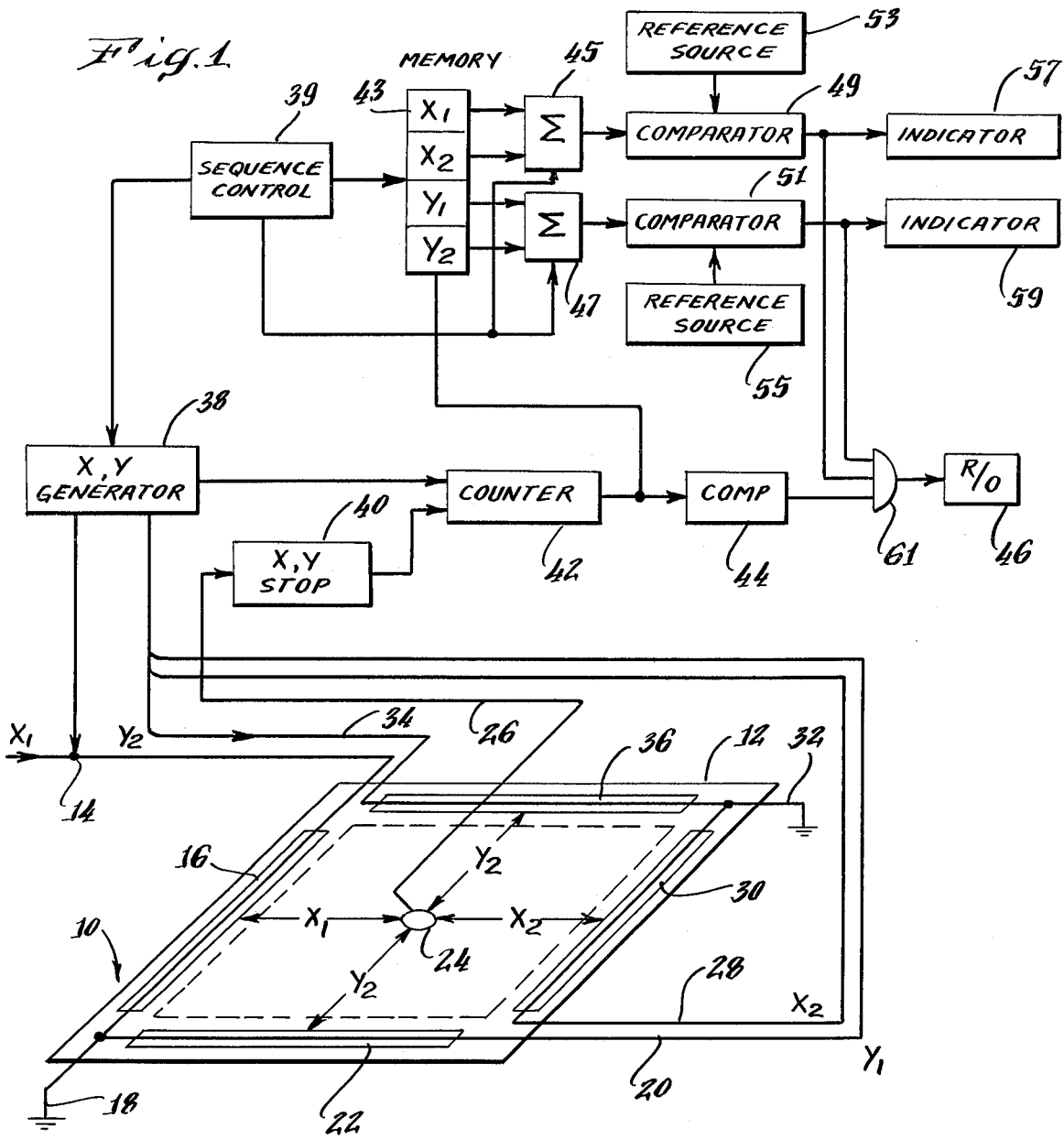
FIG. 1 is a simplified illustration, in block form, of a position coordinate determination device in accordance with one embodiment of the invention.

Referring to FIG. 1, a generalized schematic illustrating the operation of a position determination device is shown. In the example illustrated, a data surface indicated generally within the dotted line section as element 10 is defined within the general confines of a tablet-like construction 12. As was described in the aforementioned U.S. Pat. Nos. 3,904,821 and 3,846,580, digitization occurs in a magnetostrictive tablet by means of pulsations applied along the respective coordinate axes. These pulses initiate the beginning or digitization sequence in associated electronic equipment, the digitization sequence being halted by the pick-up of a stop signal from a suitable pick-up located somewhere within the data surface 10. It will be appreciated, of course, that the reverse may similarly be true, that is, the pick-up device may actually be a transmission device transmitting a pulse through the data surface 10 to suitable longitudinal pick-ups arranged along the peripheral area of the data surface 10.

For the purposes of illustration and in the preferred embodiment employed in conjunction with the invention, the data tablet 10 consists of magnetostrictive transmissive material preferably in the form of a linear array of magnetostrictive wires arranged in orthogonal position as illustrated in U.S. Pat. No. 3,846,580 although it may be a magnetostrictive sheet as described in U.S. Pat. No. 3,904,821. In either case, the digitization pulse is supplied along respective first and second orthogonal coordinates defined by the X and Y locations. For example, the initial pulse $X_1$ is applied along the line 14 wherein it is coupled to the data tablet by means of a suitable coupling 16 and connected to a ground point 18. The $Y_1$ coordinate signal is applied along the line 20 coupled to suitable coupling 22 and also terminated in the common point 18. Appropriate pulsing of the $X_1$ and $Y_1$ signal lines, for example, in response to the output of a sequence control 39 results in an $X_1 Y_1$ transmission to the pick-up device 24 which generates at its output line 26 a suitable stop signal. The stop signal turns off the digitization process which was initiated in each of the X and Y lines, respectively, by means of pulses applied along the lines.

Figure 2:
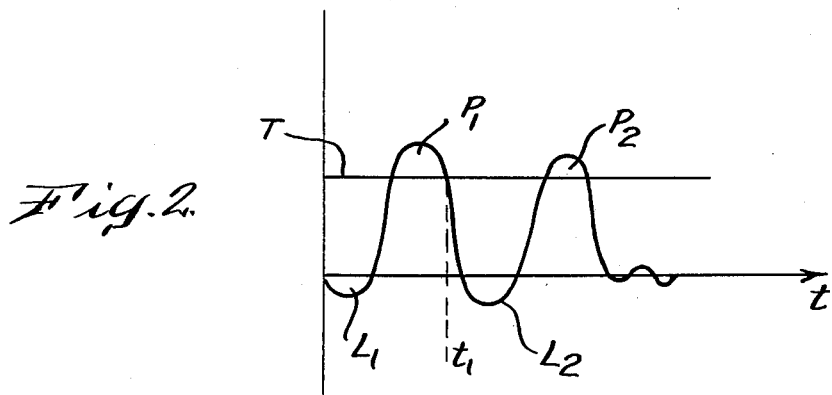
FIG. 2 is a wave front diagram illustrating the timing of a planar strain wave in a magnetostrictive sheet, as employed in the present invention.

FIG. 2 shows the normal characteristic of a strain wave, as it is applied to a data surface, whether the data surface be in the form of a matrix of wires or in the form of a magnetostrictive sheet. This figure assumes normal biasing. As shown, upon the initiation of application of energy to the data surface, there is an initial minor negative lobe $L_1$. Behind this is a large positive lobe $P_1$, a further negative lobe $L_2$, and then a further relatively large positive lobe $P_2$. Further minor lobes follow subsequently, but are of adequately low energy that they need not be considered.

In accordance with the invention, it is desirable to detect the positive lobe $P_1$ for use in the determination of position. For this purpose, a threshold level T is set, in order to avoid detection of noise insofar as possible. It is further preferable to employ the cross-over between the negative going flank of the pulse $P_1$ and the threshold T as the time at which the counter is stopped. For this purpose, then, conventional circuitry, such as a Schmitt trigger, may be employed to generate the pulse at the time $t_1$ for stopping the counter. The level detecting circuit may be provided, for example, in the stop pulse unit 40.

Under most conditions, the selection of the trailing edge of the first lobe $P_1$ is effected without difficulty. Several conditions can arise, however, that interfere with this detection. For example, if the pick-up 24 of FIG. 1 is too close to any of the pulse generating lines, the major lobe $P_1$ may have passed the pick-up device during a time when the pick-up device was disabled. In other words, due to other considerations in the system, the pick-up device and its associated circuitry is not continuously active, and the recovery time of amplifiers connected to the pick-up device may not be adequate to enable sensing of the major lobe $P_1$ when it is very close to the pulse generating line. As a consequence, the major lobe $P_2$ may be sensed instead of the major lobe $P_1$. This will result in an erroneous indication in the apparatus, since the wave front of the major lobe $P_2$ is not representative of the initiation of the count cycle.

In the provision of a magnetostrictive tablet, it is necessary that the tablet be magnetically biased. The biasing, for various reasons, can have local anomalies, whereby it is possible that a reverse bias to the data surface may occur in a particular region of the data surface. If this condition occurs at a location where the strain wave is introduced into the data surface, then the characteristic wave will be the reverse of that illustrated in FIG. 2. The formerly minor negative lobe $L_1$ may thus be a positive lobe. If this lobe is adequately large, that is, greater than the threshold level T, the strain wave front resulting therefrom may be sensed by the pick-up device. Since the system is designed so that the correct timing will occur with respect to the major lobe $P_1$, it is evident that the sensing of the lobe $L_1$ will result in an erroneous indication.

In accordance with the invention, such errors may be detected by the application of a second X coordinate $X_2$ pulse along the input line 28 to the coupling means 30 and terminated in the ground position 32. The correction coordinate $X_2$ is positioned with respect to a second reference along the same linear path as the first or $X_1$ coordinate. Similarly, a second Y coordinate $Y_2$ signal is applied along the input line 34 to a suitable coupling means 36 to the common ground point 32.

In operation, the position coordinate for which digitization is desired is represented by the pick-up 24. The pick-up 24 may be manipulatable about the data surface 10 either manually or by means of XY coordinate motion arms, such as described in U.S. Pat. No. 3,956,588 issued May 11, 1976, and assigned to the assignee of the present application, or by other means.

By way of illustration, typical operation of the device shown in FIG. 1 involves generation of a series of pulses from an XY generator illustrated generally as 38. Thus, by way of example, the X generated pulse appears along line 14 and provides a pulse along the X dimension indicated by $X_1$. Pick-up of the $X_1$ pulse by the pick-up 24 generates a stop pulse along line 26 to the stop pulse unit 40. Meanwhile, the X pulse from generator 38 is applied to the counter 42 for initiating a binary count. The stop pulse, when picked up by the transducer 24 and applied to the stop mechanism 40, stops the digitization of the counter 42. Thus, a digitization representative of the $X_1$ dimension in terms of the transmission time required for the pulse to propagate from the coupling means 16 to the pick-up 24 is placed in the counter 42. The same sequence of operations is effected in the $X_1$, $X_2$, $Y_1$ and $Y_2$ directions.

A correction for the $X_1$ and $Y_1$ positions is generated by employing the $X_2$ and $Y_2$ factors. The datum represented by each of the dimensions $X_1$, $X_2$, $Y_1$ and $Y_2$ are generated along respective common linear paths with respect to fixed reference positions defined by the coupling means contiguous with each of those dimensions. Thus, for example, the fixed reference for dimension $X_1$ would be the coupling means 16, etc. The correction factor for the X dimension is derived for the $X_1$ and $X_2$ coordinates by reading out these factors from the counter 42.

In accordance with the invention, the coordinates $X_1$, $X_2$, $Y_1$ and $Y_2$ are stored, for example, in a memory 43, under the control of the sequence control device 39. Upon the receipt of these signals, the X coordinates $X_1$ and $X_2$ are added, for example, in an adder 45, and the coordinates $Y_1$ and $Y_2$ are added, for example, in an adder 47. These summation signals are then compared in comparators 49 and 51, respectively, with reference coordinates stored in reference sources 53 and 55, respectively, to result in indications, on suitable indicators 57 or 59, respectively, if the respective sums of the signals are above or below predetermined levels.

In addition, the outputs of the comparators may be employed to close a suitable gate 61 directing the data to a read-out bus indicated generally as 46. The coordinate signals read out from the counter 42 may be applied directly to the bus 46 by way of the gate 61, or as discussed, may be directed thereto by way of a suitable computing device 44, for example, for calculating additional correction factors, such as disclosed, for example, in U.S. Pat. No. 4,018,989.

In accordance with the invention, the distance between the input coupling lines 30 and 16 is known, within given tolerances, and similarly, the distance between the input lines 22 and 36 is also known, within given tolerances. Accordingly, assuming the sensing of the correct pulses, the sum of the times for pulses to reach the sensor from each of the lines of a given coordinate is determinable, within the above tolerances. Therefore, if the sum of the pulses received on that coordinate corresponds to a time greater or less than that which corresponds to the determinable sum, it is probable that the initially sensed pulse is not, in fact, the lobe $P_1$ of the strain wave, but is a later lobe, or a negative lobe resulting from reverse bias of the data surface. Thus, if the pick-up is close to the margin, the lobe $P_1$ may be lost before recovery of the amplifier system connected to the pick-up. Accordingly, if either the lobe $L_1$ or the lobe $P_2$ is sensed, it is necessary that an indication be given that erroneous data has been received, or the erroneous data may be inhibited from application to output bus 46. Consequently, referring to FIG. 1, the reference sources 53 and 55 are set, in dependence upon the given magnetostrictive sheet, to provide comparison signals corresponding to the maximum distance between the respective data generation lines, within the measurable tolerance levels, so that if the corresponding sums of the coordinate signals added in the adders 45 and 47 are above or below these levels, the error will be indicated by the indicators 57 and 59, or alternatively, the application of data to the read-out but 46 may be inhibited by a suitable conventional gate.

It will, of course, be apparent that other systems may be employed for adding the signals, and for inhibiting or indicating the read-out of erroneous data, than that illustrated in FIG. 1, and the invention contemplates such equipment as long as the indication of error is responsive to the sum of the distances between the data generation lines and the sensor.

If desired, in accordance with the invention, the data read-out of the counter 42 for application to the bus 46 may be corrected in accordance with u.S. Pat. No. 4,018,989, by employing a ratiometric proportionality determined by a specific constant which relates to the size of the data surface. The ratiometric proportionality may be expressed in the following equations $$X \text{ (corrected)} = \frac{X_1}{(X_1 + X_2)} K_1,$$

wherein $K_1$ represents a specific constant determined by the size of the tablet, and $$Y \text{ (corrected)} = \frac{Y_1}{(Y_1 + Y_2)} K_2,$$

wherein $K_2$ represents a specific constant determined by the size of the tablet.

The computation is effected by means of the calculator device 44 which may be any standard computer chip, or the like. Preferably, the X correction is calculated first and stored. Then the Y correction is calculated and stored. Upon successful completion of the storage of the Y calculation, both the X and Y corrected values are read out onto a read-out bus indicated generally as 46.

In a typical configuration wherein a data tablet may be required to have 0.005 inch resolution, and wherein the tablet is 48 inches along a particular dimension, such as the X dimension, resolution would in that case demand 200 lines to the inch. In such a situation, the constant factor K would be 9600 (that is, 48 × 200). Thus, if the pick-up 24 in FIG. 1 is positioned at the precise center of the tablet, and the $X_1$ reading is 4805 and the $X_2$ reading is 4807, then the correction for X would be calculated at (4805 × 9600) ÷(4805 + 4807) which would equal 4799. Thus, although an incorrect reading of 4805 appeared on the $X_1$ dimension then an incorrect reading of 4807 on the $X_2$ dimension, the correct reading results in 4799, a significant improvement in accuracy. The same correction calculations would, of course, be evidently applicable in the Y dimension as well. It is therefore apparent that variations in linearity for large tablets caused by transmission media anomalies such as wire conditions or nonumiformity in wire, which causes changes in its character, and other variations due to length, temperature, processing defects, etc. are compensated for. The correction system would, in addition, have absolute accuracy and zero temperature dependence. The digitization techniques for corrected X and Y values are carried out continuously, as is the nature of the operation. The ratios are therefore calculated successively upon each successive reading of X and Y and variations in both long and short term characteristics are completely cancelled.

In the preceding example, wherein a count of 9600 was assumed between the data generation lines, in a given instance, the maximum distance between the line $X_1$ and the adjacent edge of the sheet may be, for example, 500 lines. In this instance, the tolerance in the determination of the distance between the pulse generation lines may be assumed to be less than 500, for example 400, whereby an error in the reading will be indicated in accordance with the invention, when the sum of the signals $X_1$ and $X_2$ exceed 9600 plus 400, or 10,000. Accordingly, the reference source 53, in this example, may be set at the reference value of 10,000 pulses. It will, of course, be apparent that the tolerance levels may be set at such values, in dependence upon the parameters of the magnetostricitive sheet, such that the possibility of determining the sensing of erroneous strain waves is inhibited, as a result of the summing of the true received signals along the given coordinates.

Figure 3:
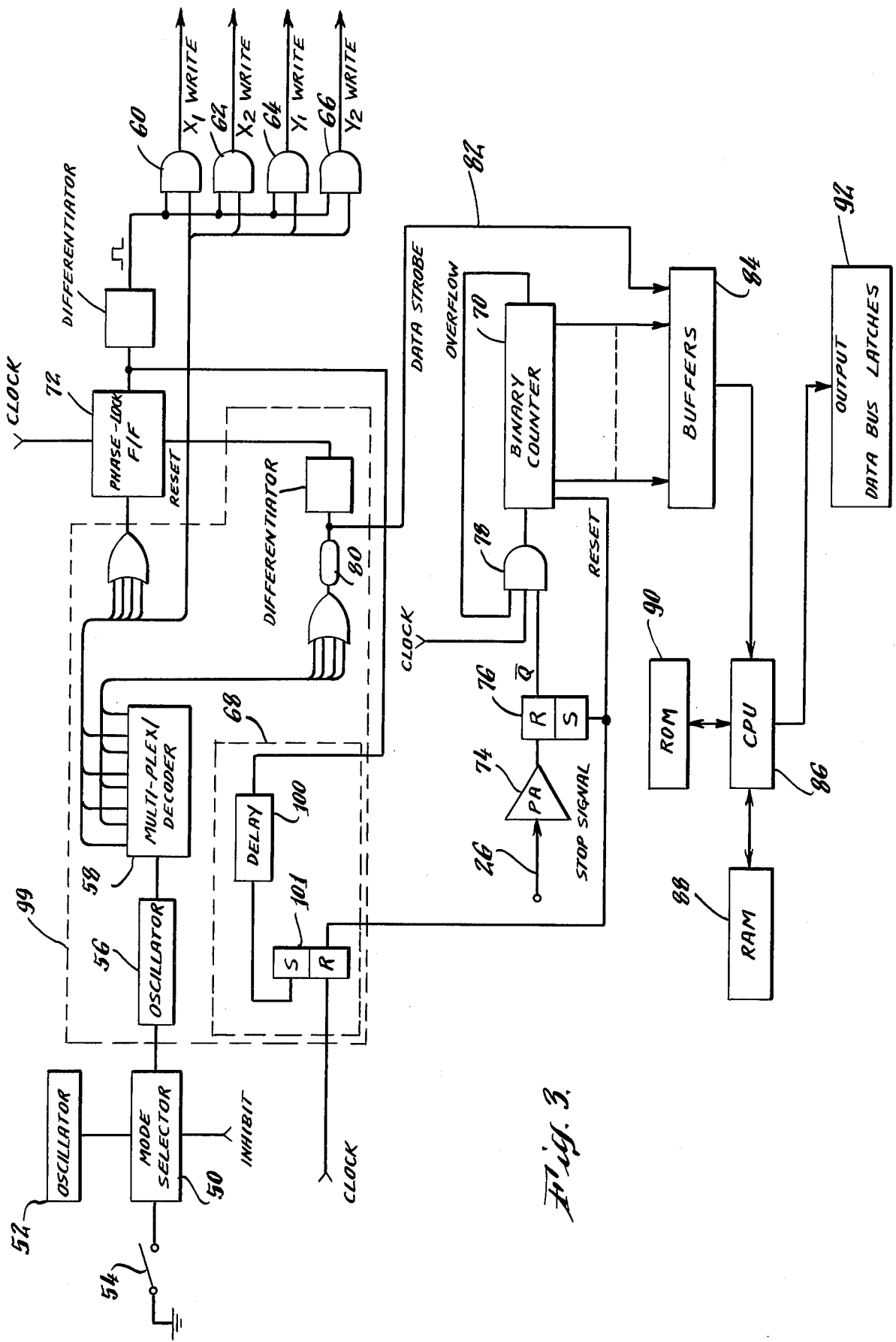
FIG. 3 is a block diagram of a logic circuit that may be employed for the system of FIG. 1.

Referring now to FIG. 3, a more detailed explanation of the electronic systems utilized in conjunction with FIG. 1 is set forth. As shown in FIG. 3 a mode selection unit 50 utilizes either an oscillator input 52 or a single triggered input 54 for the generation of a series of pulses derived from the oscillator 56 which are provided through the multiplexer decoder unit 58. The multiplexer decoder unit separates the signals into $X_1$, $X_2$, $Y_1$ and $Y_2$ control signals, after suitable gating and pulse shaping, through the respective gates 60, 62, 64 and 66.

As shown in FIG. 1, a certain margin spacing exists between the coupling units representing the X and Y pulse generation lines and the edges of the data surface 10. This spacing is compensated for by means of the margin sequencer unit 68, causing an appropriate offset in the binary counter 70. The margin sequencer 68 may be comprised, for example, of a delay device 100, for example a monostable multivibrator, connected to set a flip-flop 101, the flip-flop 101 being reset by the clock. The output of the flip-flop 101 is connected to set the flip-flop 76, to enable passage of the stop signal, and to reset the binary counter 70 to initiate the start of a counting sequence. The binary counter thus starts in accordance with the occurrence of the pulse from the output of phase lock flip-flop 72 which responds to the appearance of any of the X and Y pulses from the multiplexer 58, passed through the margin sequencer 68 for the reasons set forth above, and initiating the start of the binary counter 70. The appearance of the pulse at the pick-up 24 causes the application of the pulse along line 26 to the pre-amp 74 and the RS flip-flop 76, shutting off the gate 78 and disabling the clock to the binary counter 70. After an appropriate delay set by delay 80, a data strobe pulse is passed along line 82 to the temporary storage unit 84. The temporary storage unit 84, which may be tri-state buffers or other suitable digital holding circuitry, responds to the strobe pulse and transfers the data from the binary counter. That data, representing a particular datum, such as, for example, the datum represented by the $X_1$ dimension in FIG. 1 with respect to the fixed reference position 16, is in turn passed from the unit 84 in further response to the data strobe pulse to the CPU 86 where it is stored in the random access memory 88 in accordance with the program stored in the read-only memory 90. Next the $X_2$ dimension datum is produced in the same manner, the data strobe acting to transfer the next datum represented by the $X_2$ dimension through the buffers into the CPU 86. In accordance with the program stored in the read-only memory 90, the data position $X_1$ is retrieved from the random access memory and processed in the CPU 86 as set forth above. The reference values corresponding to the values stored in sources 53 and 55 of FIG. 1, and constant K, if this value is used, are prestored in the read-only memory 90, and retrieved from the memory in accordance with the program also stored in the read-only memory 90, and acted upon in the CPU to produce the X value. For convenience, it is apparent that the read-only memory may be programmable. The value, if it is correct, is then stored back in the random access memory. Further, although shown as discrete components, each function performed by the units enclosed within the block 99 may be physically embodied as a single integrated chip and also may be operated under control of the programmed CPU 86.

Next the Y calculations are performed in exactly the same manner. The $Y_1$ datum is generated, transferred via the units 84 to the random access memory. The $Y_2$ datum is generated and transferred into the CPU and a sum value may be calculated for $Y_1$ and $Y_2$ datum in the same manner as the $X_1$ and $X_2$ datum calculated in X value. When the Y value has been calculated to be correct, the read-only memory program acts to transfer the X and Y values out of the CPU into the data bus output latches 92 for utilization as the X and Y digitization. The ultimate use of the digitization in corrected form may be employed for any sequence of operation requiring the digitization of continuous or discontinuous position sensing of the pick-up 24 with respect to the data surface. These utilizations are fully set forth in the aforementioned patents, U.S. Pat. Nos. 3,904,821 and 3,846,580. The crystal controlling the repetition rate of the clock signals employed in the counter must correspond to the highest resolution. Thus, if a 0.005 inch resolution is employed, it is preferable to use a crystal frequency of at least 40 megahertz in order to achieve a pulse sequence sufficient to handle such resolution.

By way of example, the CPU can be an Intel Type 8080A, the RAM an Intel Type 8111, and the ROM an Intel Type 8302.

In a particularly advantageous aspect of the invention, employing the system of FIG. 3, the program of the CPU is selected such that for each series of measurements, that is, for each measurement of $X_1$ and $X_2$, and for each measurement of $Y_1$ and $Y_2$, the corresponding constants K are also measured during the sequence. Consequently, sufficient data will be obtained during each measurement sequence to enable the generation of the true location of the position of the data surface, as well as whether or not erroneous data had been received. In this method, it is apparent that the approximate size of the data surface, as represented by the initial summation of $X_1$ and $X_2$, (as well as the initial summation of the values $Y_1$ and $Y_2$), corresponds to a given size of data surface. If the desired resolution value is stored in the memories of the system, then it is apparent that the constant K for the determination of the true position may readily be determined by the above formulae. Accordingly, in accordance with the invention the memories of the system may be provided with a store of constant K values corresponding to the different summed values $X_1$ and $X_2$, as well as $Y_1$ and $Y_2$, that are detected.

With this information, as above discussed, the system may be programmed so that the sum of the distances along each coordinate is tested during each measurement cycle to determined if the values represent correct values, in accordance with the above disclosure, and the corrected values corresponding to the true position are then also calculated, as above discussed, to provide the desired output. With this arrangement, a minimum of hardware is required in the system, and the program is adaptable for use with any size of data surface. A program suitable for this purpose was attached as an exhibit to the specification as originally filed in the application which matured into the present patent.

Although magnetostrictive digitization systems have been described for use with the present invention, it will be understood that other forms of digitization techniques may be employed. Thus, for example, the system may be employed with crystal generation or digitization signals employed for position determination or with optical, sonic, sliding scale, or any system wherein linearity, temperature dependence compensation is desired and wherein greater accuracy is a significant criteria.

What is claimed is:

1. A position determination device comprising a data surface, means for generating a first datum representing the location of a position with respect to a first reference on said data surface along a linear path, means for generating a second datum representing the location of said position with respect to a second reference on said data surface along said linear path, means for adding said first and second datum to produce a third datum, means for comparing said third datum with a predetermined value representative of the distance between said first and second references for determining the correctness of said first datum as a measure of the location of said position.

2. The position determination device of claim 1, wherein said data surface comprises a magnetostrictive sheet, and said means for generating first and second datum comprise means for introducing strain waves in said sheet.

3. The position determination device of claim 2, further comprising a sensor for strain waves positionable at said location, said means for generating said first and second datum further comprising means for introducing strain waves at determined times at a pair of positions on said sheet displaced from the edges thereof, whereby said first and second datum comprise first and second signals representing the times for said strain waves to reach said sensor.

4. The position determination device of claim 3, wherein said means for introducing strain waves comprise lines on said sheet spaced from the edges thereof.

5. The position determination device of claim 1, further comprising means for generating a fourth datum representing the location of said position with respect to a third reference on said data surface along a second linear path normal to said first-mentioned linear path, means for generating a fifth datum representing the location of said position with respect to a fourth reference on said data surface along said second linear path, means for adding said fourth and fifth datum to produce a sixth datum, and means for comparing said sixth datum with a predetermined value for determining the validity of said fourth datum as a measure of the location of said position.

6. The position determination device of claim 5, wherein said data surface comprises a magnetostrictive sheet, further comprising a sensor movable to said position on said magnetostrictive sheet, first and second substantially parallel input lines normal to said first-mentioned linear path, and third and fourth parallel input lines normal to said second linear path, said means for producing said first, second, fourth and fifth datum comprising means for introducing strain waves sequentially into said magnetostrictive sheet on said first, second, third and fourth lines respectively, at determined times, whereby said sensor receives said signals at times corresponding to said position.

7. The position determination device of claim 6, comprising counting means, and means for applying pulses to said counting means between the time of application of a strain wave at each line and the time of receipt of a signal by said sensor, whereby the count stored in said counter corresponds to said position along the respective path.

8. The position determination device of claim 7, further comprising means for storing the counts of said counter, and means for adding different counts store in said storing means for producing said third and sixth datum.

9. In a method for operating a position determination device including a magnetostrictive data tablet, a pair of parallel spaced apart input lines, and a sensor, wherein strain waves are sequentially introduced into said magnetostrictive data tablet by applying signals sequentially to said input lines, and sequentially storing counts in a counter corresponding to the times required for strain waves to pass from said input lines to said sensor, the improvement comprising adding counts sequentially stored in said counter to produce a signal substantially corresponding to the distance between said input lines, and comparing said last-mentioned signal with a given value, to determine if said last-mentioned signal is within a range including said value, and indicating the occurrence of said last-mentioned signals which are below or above said range.

10. A method for determining a position of a data surface, comprising generating a first datum representing the location of a position with respect to a first reference on said data surface along a linear path, generating a second datum representing the location of said position with respect to a second reference on said data surface along said linear path, adding said first and second data to produce a third datum, comparing said third datum with a predetermined value representative of the distance between said first and second references for determining the correctness of said first datum as a measure of said location of position, and combining said first and third data to produce a fourth datum representative of the true location of said position on said surface.

11. A method for sequentially determining positions on a data surface, wherein each determination of position comprises generating a first datum representing the location of a position with respect to a first reference on said data surface along a linear path, generating a second datum representing the location of said position with respect to a second reference on said data surface along said linear path, adding said first and second data to produce a third datum, and comparing said third datum with a predetermined value representative of the distance between said first and second references for determining the correctness of said first datum as a measure of the location of said position.

12. The method of claim 11, wherein each determination of position further comprises combining said first and third data to produce a fourth datum representative of the true location of said position on said surface.

13. The method of claim 12, comprising storing constant values corresponding to the sizes of data surfaces and determined measurement resolutions, and said step of combining comprises, combining a stored constant value with said combined first and third data to produce said fourth datum.

* * * * *